United States Patent
Massey et al.

[11] Patent Number: 6,073,422
[45] Date of Patent: Jun. 13, 2000

[54] FILLING AND LIDDING MACHINE AND METHOD

[75] Inventors: Samuel M. Massey, Joiner; Richard Phillips, Osceola; David Thompson, Wilson; Paul Ballentine, Mountain View; Jim Garner, Heber Springs, all of Ark.

[73] Assignee: Osceola Foods, Inc., Osceola, Ark.

[21] Appl. No.: 09/132,186

[22] Filed: Aug. 11, 1998

[51] Int. Cl.[7] ................................................ B65B 7/28
[52] U.S. Cl. .......................... 53/471; 53/282; 53/329.5; 53/373.4
[58] Field of Search .................. 53/282, 329.5, 53/370.4, 373.4, 389.3, 471

[56] References Cited

U.S. PATENT DOCUMENTS

| | | | |
|---|---|---|---|
| 3,112,590 | 12/1963 | O'Brien | 53/329.5 |
| 3,246,448 | 4/1966 | Amic, Sr. | 53/329.5 |
| 3,481,100 | 12/1969 | Bergstrom | 53/329.5 |
| 3,673,760 | 7/1972 | Canamero et al. | 53/22 A |
| 3,685,251 | 8/1972 | Mahaffy et al. | 53/329.5 |
| 3,792,566 | 2/1974 | Kinney | 53/329.5 |
| 3,792,567 | 2/1974 | Balcome | 53/282 |
| 3,851,441 | 12/1974 | Marchand | 53/116 |
| 4,563,855 | 1/1986 | Smith et al. | 53/128 |
| 4,608,809 | 9/1986 | Francis et al. | 53/471 |
| 4,819,412 | 4/1989 | Sengewald | 53/471 |
| 5,127,211 | 7/1992 | Mancini | 53/467 |
| 5,272,854 | 12/1993 | Ye et al. | 53/329.5 |
| 5,371,996 | 12/1994 | Ueda | 53/329.5 |
| 5,447,736 | 9/1995 | Gorlich | 426/396 |
| 5,534,282 | 7/1996 | Garwood | 53/329.5 |
| 5,649,412 | 7/1997 | Binacchi | 53/559 |

*Primary Examiner*—John Sipos
*Attorney, Agent, or Firm*—J. Charles Dougherty

[57] ABSTRACT

A lidding machine and method for filling containers with a flowable food product is disclosed. Extraneous tabs extending from the container lids after the lids are cut apart are trimmed closely using knives with a blade curvature that matches the curvature of the edge of the containers. One or more "feet" are used to hold the lids in place during the cutting process. A two-layer lid may be used for such containers, the inner lid having openings through which the food product may be dispensed, and the outer lid being removable. The outer lid may be designed so that it partially covers the inner lid, and has a tab that does not extend beyond the edge of the container. The consumer may open the container by pulling this tab back across the inner lid.

19 Claims, 4 Drawing Sheets

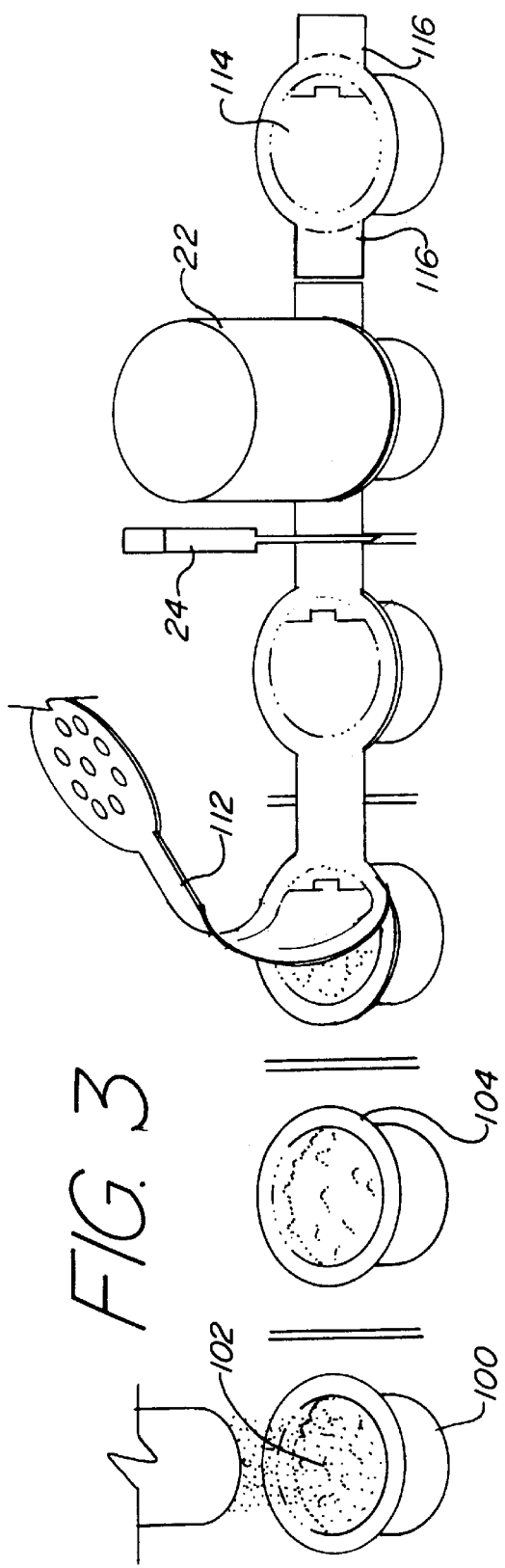
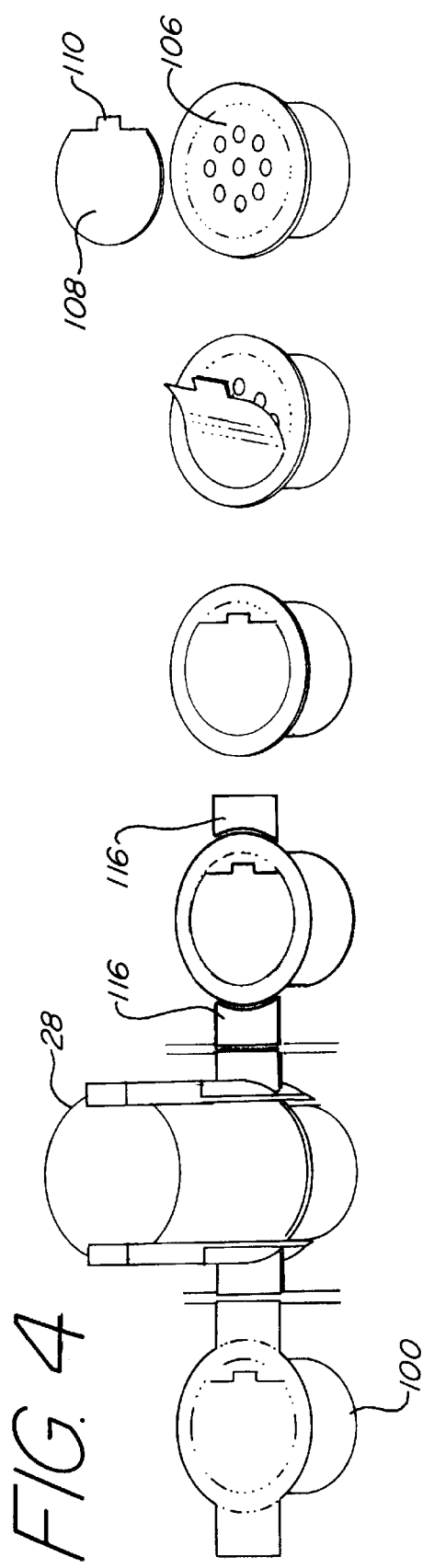
FIG. 3
FIG. 4

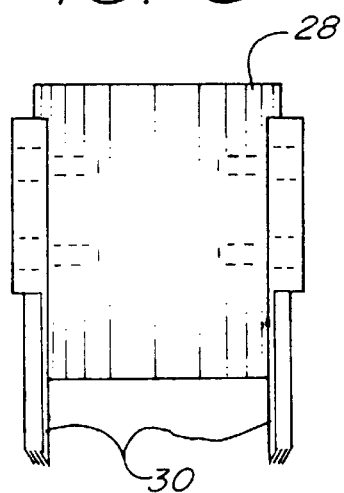
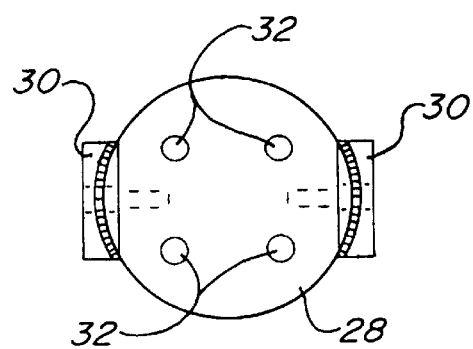
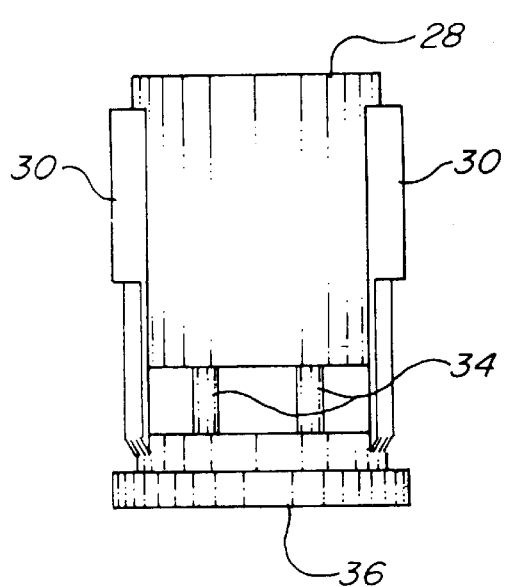
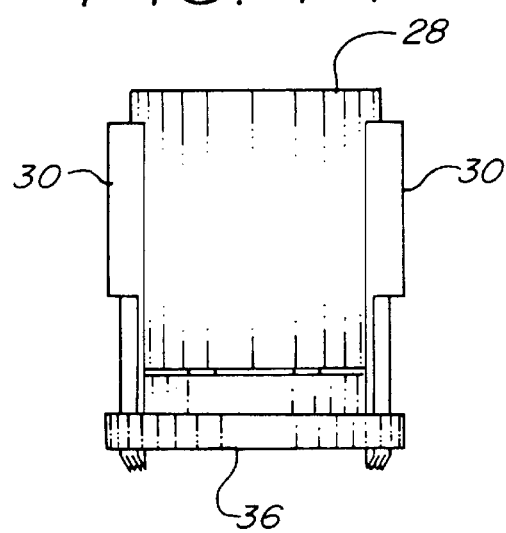

FILLING AND LIDDING MACHINE AND METHOD

FIELD OF THE INVENTION

The present invention relates generally to a lidding machine and method, and in particular to a machine and method for filling containers with a flowable food product and then sealing those containers with one or more lids, wherein the lid and container rim is closely trimmed using curved blades and one or more "feet" that hold the lid in place during trimming. The present invention allows the consistent and rapid packaging of free-flowing and non-free-flowing food products into containers that have no sharp corners or tabs extending from the package.

BACKGROUND OF THE INVENTION

It is known in the art to fill containers with flowable food products and then seal those products with a removable lid. Common examples of such containers are the plastic single-serving margarine containers popular at restaurants. Such containers have a lid that may be easily removed by hand. The containers are typically sealed using a single lid, with a tab extending from that lid on one side of the container. To remove the lid from such containers, the consumer grasps one of the tabs with one hand while holding the container in the other hand. The consumer then peels the lid away from the container by pulling the tab back across the top of the container. The consumer may then discard the lid and pour or otherwise remove the desired product from the container.

Various methods and machines for the lidding of such containers are known in the art. U.S. Pat. No. 4,563,855 to Smith et al. is one example. Smith '855 discloses a machine for packaging an edible liquid in round, single-serving containers. A ribbon or "daisy chain" of lids is fed into the Smith '855 lidding machine and sealed onto containers passing below. The containers are moved along through the lidding machine upon a chain of platens. The individual lids are separated from each other using straight blades that extend from a cut-off wheel. Because straight blades are used for trimming, the lids are not trimmed closely against the rounded edges of the containers. The containers resulting from this lidding process thus have tabs extending on either side that the consumer may grasp to open the container and reach the edible liquid inside.

U.S. Pat. No. 4,819,412 to Sengewald discloses a process and apparatus for forming packages from a thermoplastic material. The packages have a projecting flange edge, which connects the packages to those formed adjacent to it. After product is placed within the package, a thermoplastic sheet is attached over the flange edge to seal the packages and protect the product inside. The packages are separated from one another along weakening lines formed at the edges of the projecting flange edge of each package. After separation, each package has a tab extending from one corner so that the user may easily grasp the covering sheet and remove it to reach the product inside.

Each of these prior art devices leaves a tab extending from the package. Using a conventional lid, a tab is necessary since the consumer must grasp the tab to remove the lid and reach the product inside. These tabs may present a safety hazard, however, because they typically have rough or sharp edges. These sharp edges are a natural result of the lidding process since the tabs are typically the point from which the lidding material or container was cut away from other lids, containers, or flashing. If the containers were cut apart with a knife, the edges formed on the tabs may well be sharp enough to cut the consumer who opens the container if care is not taken.

Moreover, the sharp edges along tabs extending from the containers can cause damage to other containers in the same shipping carton. Typically such containers are tossed into a carton for shipping without careful stacking. Because of cost concerns, such cartons do not contain padding, dividers, or other protective materials between the individual packages. As the contents of the carton are jostled during shipping, the sharp edges of the container tabs may pierce the lidding of adjacent containers, thereby causing loss of product or spoilage before the product reaches the consumer.

In addition, tabs extending from the containers reduce the aesthetic appearance of the product packaging for consumers. Thus tabs may make the product less marketable than a product packaged in a container that has no tabs extending out from the package.

SUMMARY OF THE INVENTION

The present invention is directed to a machine and method for filling, lidding, and sealing small individualized containers for free-flowing and non-free-flowing food products, such as premixed spices and parmesan cheese. The present invention overcomes the problems with prior art lidding machines and methods by employing one or more extending "feet" which house curved knives. These knives cleanly and neatly trim the container and lid tabs close to the curved edge of the container while a "foot" holds the lid in place.

Because lids are fed into the lidding machine on a long roll, the lids must be cut apart during the lidding process. The result of this cutting is that each lid has a tab extending from two sides where the lid was connected to the previous and subsequent lid in the roll. To cleanly cut away these tabs, the feet are designed to extend downward over a previously lidded container and securely hold the lid in place. As the lid is held in place over the container, curved knives extend from the feet and closely trim the tabs from the lids. Since the curve of the knives matches the curve on the edge of the containers, a precise cut is achieved. A specially designed platen is used to hold the container and to receive the knives extending from each foot during the trimming process.

A special two-piece lid allows the consumer to open the containers despite the lack of a tab extending over the edge of the container. The lower lid covers the container, and may contain holes through which the consumer may dispense the product inside; this lower lid is not removed from the container by the consumer. An upper lid is attached to the lower lid, and features a tab that the consumer may grasp to peel the upper lid away from the lower lid. Because the upper lid does not completely cover the lower lid, a tab may be incorporated into the upper lid that does not extend beyond the lip of the container.

OBJECTS OF THE INVENTION

It is therefore an object of the invention to produce a lidded container with no tabs extending beyond the rim of the container;

It is a further object of the invention to trim away the tabs from a lidded container using a "foot" to securely hold the lidded container in place while curved knives cut the tabs from the container.

It is a further object of the invention to use a two-layer lid on a lidded container, such that the consumer need only remove the top lid to reach the product, using a tab that extends from the top lid but does not extend beyond the rim of the container.

These and other objects and advantages of the present invention will be apparent from a consideration of the detailed description of the preferred embodiments in conjunction with the drawings which are briefly described as follows:

BRIEF DESCRIPTION OF THE DRAWINGS

FIG. 3 is a perspective sequence view of the container filling operation using a preferred embodiment of the present invention, showing the filling of a container through the sealing and initial cutting of the lid roll.

FIG. 4 is a continuation of the perspective sequence view of FIG. 3 showing the trimming process, and showing the lid structure of a lidded container using a preferred embodiment of the present invention.

FIG. 8 is a side elevation view of a foot from a preferred embodiment of the present invention.

FIG. 9 is a bottom view of a foot from a preferred embodiment of the present invention.

FIG. 10 is a side elevation view of the foot/curved knife assembly in the raised position.

FIG. 11 is a side elevation view of the foot/curved knife assembly in the lowered position.

DETAILED DESCRIPTION OF THE PREFERRED EMBODIMENTS

Figure 2:
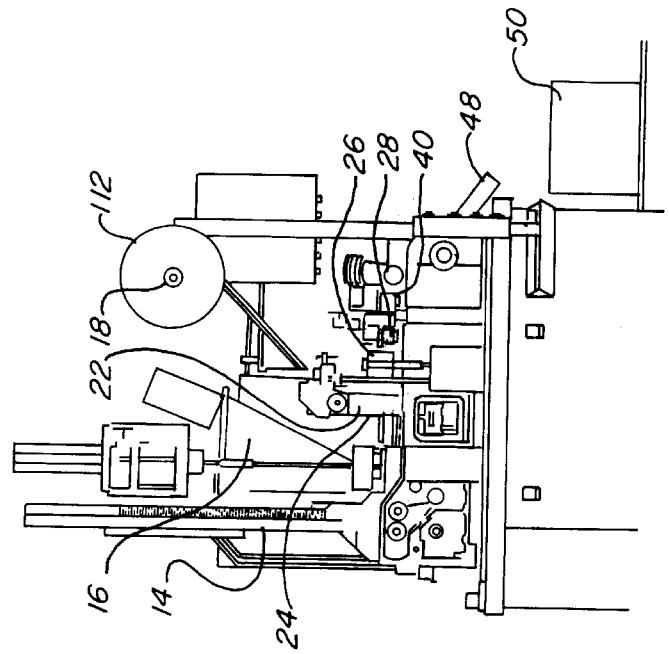
FIG. 2 is a side elevation view of a preferred embodiment of the lidding machine invention.
Figure 1:
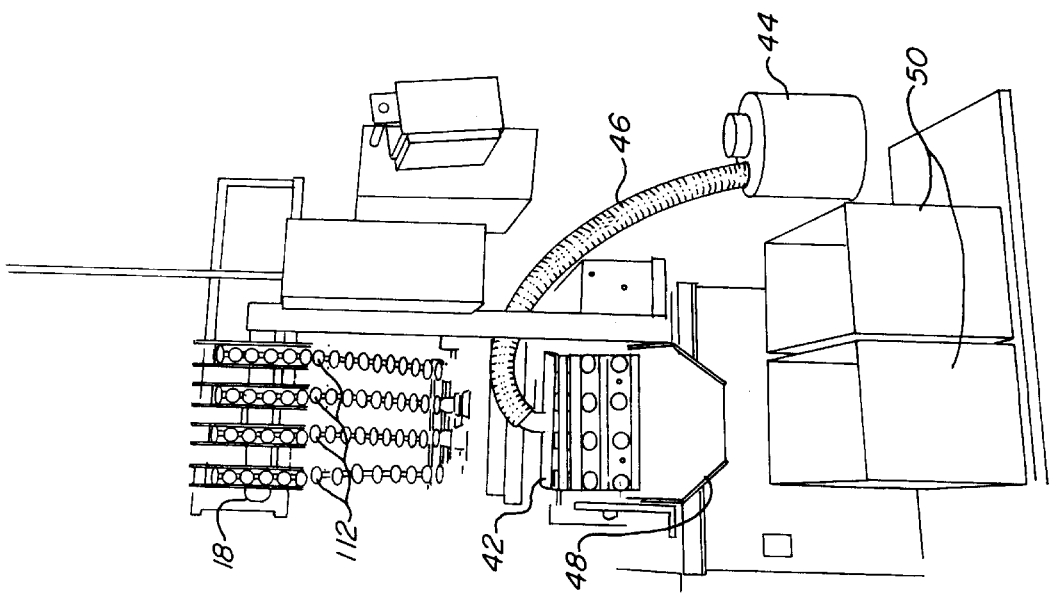
FIG. 1 is a perspective end view of a preferred embodiment of the lidding machine invention, showing the end of the preferred embodiment from which filled and lidded containers are dispensed.
Figure 5:
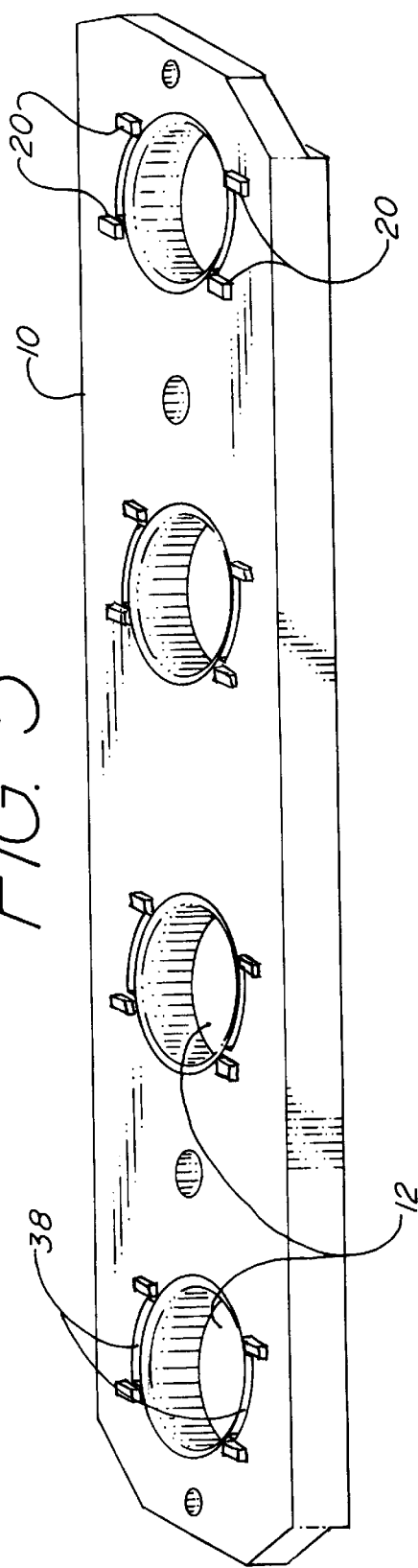
FIG. 5 is a perspective view of a platen from a preferred embodiment of the present invention.

FIGS. 1 and 2 show an overall view of a preferred embodiment of the present lidding machine invention. The machine comprises an endless chain of platens 10 which revolve within the machine in conveyor-belt fashion. Each platen 10 has a number of platen recesses 12 that are sized to receive individual containers 100, as shown in FIG. 5. Although in the illustrated preferred embodiment each platen 10 has four platen recesses 12, it is understood that the invention is not so limited and that platens 10 with any number of platen recesses 12 could be used.

Containers 100 are fed into platen recesses 12 of platens 10 at the rear of the lidding machine using container dispenser 14. A series of gears (not shown) operate to dispense one container 100 into each platen recess 12 in a conventional fashion as platens 10 pass by underneath.

As containers 100 riding in platens 10 move forward, they are filled by one of two means. In a first filling method, filler 16 is an auger-type filler of the type that is well known in the art. The auger-type filler 16 is especially well-adapted to the dispensing of a flowable product 102 that is not relatively free flowing, such as parmesan cheese, because the internal auger forces the material downward and into containers 100 as they pass underneath. A second filling method, also known in the art, uses a filler 16 that comprises a rotating cylinder lying just below a hopper. The cylinder features a plurality of pockets along its surface that are sized to hold the same amount of flowable product 102 as does each container 100. As a platen 10 with containers 100 passes underneath filler 16, the cylinder rotates to pour flowable product 102 from the cylinder's pockets into containers 100 below. This form of filler 16 is preferred when flowable product 102 is relatively free-flowing, as in the case of most spices.

Referring now to FIGS. 3 and 4, the lidding operation is depicted in sequential fashion. Like the well-known, individual-serving margarine packages, the containers 100 used in conjunction with the present invention have a lip 104 that extends around the upper edge of the container 100. In the case of margarine packages, a single lid is attached to the package's lip. The margarine package lid has at least one tab extending from the lid beyond the lip of the package. In the present invention, by contrast, a two-piece lid is used. Inner lid 106, which lies directly on top of lip 104 of container 100, may contain holes or other openings for dispensing flowable product 102 inside. On top of inner lid 106 is outer lid 108, which is attached to inner lid 106 by a pressure-sensitive adhesive or the like. Outer lid 108 has pull tab 110 which may be used to peel outer lid 108 away from inner lid 106 and thereby allow access to flowable product 102 inside container 100. Pull tab 110 on outer lid 108 does not, however, extend beyond lip 104 because outer lid 108 does not cover inner lid 106; instead, pull tab 110 lies on top of inner lid 106 within the circumference of lip 104. Inner lid 106 and outer lid 108 are manufactured in a daisy-chain form on lid rolls 112, with inner lid 106 and outer lid 108 presealed together.

Lid rolls 112 are fed through the lidding machine from lid roll spindle 18 in a conventional fashion; one lid roll 112 is required for each platen recess 12 in platens 10. Lid rolls 112 are guided into place above platens 10 using conventional means. Platens 10 feature projections 20 on either side of platen recesses 12, which help align each lid rolls 112 and prevent side-to-side and lengthwise movement of lid rolls 112 above platens 10 during the lidding process. Lid rolls 112 fit between the pairs of projections 20 that lie on either side of each platen recess 12.

In the next step of the process, the platens 10 with lid rolls 112 held in place above containers 100 by projections 20 move underneath fingers 22. Fingers 22 then extend downward, holding the segment of material on lid roll 112 that is between individual lid assemblies 114 in place against platens 10. It is important to note that lid roll 112 is fed into the lidding machine such that the segment of material on lid roll 112 that is between individual lid assemblies 114 extends over the gap between adjacent platens 10. While fingers 22 hold lid roll 112 in place, straight knives 24 extend downward and sever an individual lid assembly 114 from each lid roll 112 by slicing through the segment of material on lid roll 112 that is between individual lid assemblies 114, and passing into the gap between adjacent platens 10. The resulting individual lid assemblies 114 will have residual tabs 116 extending from each side where the cut was made. In a preferred embodiment, straight knives 24 are serrated, which reduces the tendency of the knives to pull the lid roll 112 out of place, and increases the precision of the cut. Straight knives 24 also feature a beveled tip in a preferred embodiment, which also increases the precision of the cut.

The platens 10 then carry the containers 100 with lid assemblies 114 lying on top to initial sealing assembly 26. Initial sealing assembly 26 uses heat to lightly tack the lid assemblies 114 to containers 100 so that the lid assemblies 114 do not pull away from containers 100 before the final sealing step. The seal formed by initial sealing assembly 26 is not necessarily a complete seal of lid assembly 114 to the container. It should be understood that initial sealing assembly 26 is used in this preferred embodiment of the invention, but the invention also contemplates the exclusion of initial sealing assembly 26 and the initial sealing step.

Figure 7:
FIG. 7 is an end elevation view of a curved knife from a preferred embodiment of the present invention.
Figure 6:
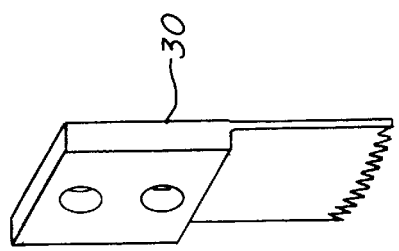
FIG. 6 is a perspective view of a curved knife from a preferred embodiment of the present invention.

Platens 10 then proceed to the next cutting step where the residual tabs 116 are cut away from lid assemblies 114. Referring now to FIGS. 8 and 9, attached to upper foot 28 are curved knives 30. Preferably, curved knives 30 are attached to upper foot 28 by bolts or other easily removable fastening means such that curved knives 30 may be easily replaced or removed for inspection. As shown in FIGS. 6 and 7, curved knives 30 are curved around the longitudinal axis of the blade, resulting in a knife that, when plunged downward, cuts in an arc shape. The curvature of curved knives 30 precisely matches the curvature along the edge of containers 100. As shown in FIG. 5, each platen 10 has a pair of platen slots 38 on either side of platen recesses 12 to receive curved knives 30 as they cut through residual tabs 116 and pass through platen 10. Platen slots 38 are curved to precisely match the curvature of curved knives 30.

Referring again to FIG. 9, upper foot 28 includes guide rod passages 32 at its lower end. Guide rod passages 32 receive guide rods 34 that are attached to lower foot 36. Upper foot 28 also comprises biasing members (not shown) such that lower foot 36 is normally biased away from upper foot 28, as shown in FIG. 10. The biasing members of upper foot 28 may be of any conventional sort, such as helical springs.

To cut residual tabs 116 from a lid assembly 114, upper foot 28 first extends downward toward platen 10. As upper foot 28 extends downward, lower foot 36 comes into contact with lid assembly 114 lying on top of container 100 and platen 10. The biasing members within upper foot 28 holds lower foot 36 firmly against lid assembly 114 as upper foot 28 continues to descend, thereby holding lid assembly 114 in place on container 100. Curved knives 30, which are rigidly attached to upper foot 28, descend with upper foot 28 until they pass through the slots in lower foot 36. Curved knives 30 then cut through residual tabs 166 directly next to lip 104 of container 100 as they move downward. Finally, curved blades 30 pass through platen slots 38 (shown in FIG. 5) before upper foot 28 comes into contact with lower foot 36, which stops the downward movement of upper foot 28 and curved blades 30.

Because curved knives 30 have a curvature that matches the curvature along the edge of container 100, a precise cut is possible to fully remove residual tabs 116. Also, because the slots in lower foot 36 precisely match the shape of curved knives 30, the risk of lid assembly 114 tearing during the cutting process is minimized. Like straight knives 24, curved knives 30 are preferably serrated, which also increases the precision of the cut and decreases the possibility of lid assembly 114 pulling out of position during the cut. Curved knives 30 also feature a beveled tip in a preferred embodiment, which further increases the precision of the cut.

After residual tabs 116 have been cut away, platens 10 then proceeds to final sealing assembly 40. Final sealing assembly 40 hermetically heat seals lid assemblies 114 to containers 100 in a conventional fashion. It should be noted that although this preferred embodiment of the present invention uses two sealing steps, the invention also comprises a machine wherein the initial sealing step hermetically seals lid assemblies 114 to containers 100 and thus the final sealing step is not required. Likewise, the invention also contemplates a machine and method wherein the initial sealing step is deleted.

Once platen 10 passes final sealing assembly 40, the platen advances under vacuum nozzle 42. Vacuum 44 pulls the now-separated residual tabs 116 through vacuum nozzle 42 and vacuum hose 46 and thus removes them from the lidding machine. As platens 10 reach the end of the lidding machine, then begin to turn under, thereby dropping the now-sealed containers 100 down chute 48 and into bins 50 waiting below. In one embodiment of the invention, plastic bags may be placed in bins 50 to catch containers 100, and thereafter transfer containers 100 into cartons for shipping. Also in a preferred embodiment, a conventional counter gear (not shown) may be used to keep track of the number of containers 100 that have been dropped into bins 48 to facilitate consistent packaging.

The present invention has been described with reference to certain preferred and alternative embodiments which are intended to be exemplary only and not limiting to the full scope of the invention as set forth in the appended claims.

What is claimed is:

1. A lidding machine comprising:
   (a) an endless chain of platens, each of said platens comprising means to hold at least one container having a circumferential lip;
   (b) a filler above said platens, wherein said filler is adapted to dispense flowable product into the containers held by said platens;
   (c) a lid roll spindle above said platens, wherein said lid roll spindle is adapted to carry at least one chain of lids and dispense the lids over the containers held by said platens, wherein the lids in the chain of lids are connected by tabs extending between each lid in the chain;
   (d) at least one finger above said platens, wherein said finger is downwardly extendable to hold the lids firmly against the containers;
   (e) at least one straight knife above said platens, wherein said straight knife is downwardly extendable to sever the lid tabs and thereby separate the chain of lids into individual lids while leaving portions of the upstream and downstream tabs attached to said severed lid extending beyond said lip;
   (f) first sealing means downstream of said straight knife above said platens, wherein said first sealing means is downwardly extendable to seal the lids to the containers;
   (g) at least one foot downstream of said sealing means above said platens, wherein said foot is downwardly extendable to hold the lids in place on the containers;
   (h) at least one curved knife attached to said foot, wherein said curved knife is downwardly extendable to cut away said upstream and downstream portions of the lid tabs while said foot simultaneously holds the lids in place.

2. The lidding machine of claim 1, wherein said foot has at least one foot slot through which said curved knife may pass.

3. The lidding machine of claim 2, wherein each of said platens has at least one platen slot through which said curved knife may pass.

4. The lidding machine of claim 3, wherein said curved knife possesses the same degree of curvature as the edge of the containers.

5. The lidding machine of claim 4, wherein said curved knife comprises a serrated edge.

6. The lidding machine of claim 5, wherein said curved knife further comprises a beveled tip.

7. The lidding machine of claim 3, wherein each of said platens further comprises a plurality of projections, wherein said projections are shaped to hold the roll of lids longitudinally in place over the containers when the containers are held in said platens.

8. The lidding machine of claim 1, wherein said foot comprises:

(a) an upper foot to which said curved knife is attached;

(b) a lower foot; and (c) at least one guide rod movably attaching said lower foot to said upper foot.

9. The lidding machine of claim 8, further comprising at least one biasing member in communication with said upper foot and said guide member, wherein said biasing member biases said lower foot downwardly away from said upper foot.

10. The lidding machine of claim 9, wherein said lower foot has at least one foot slot to receive said curved knife as said curved knife approaches said lower foot.

11. The lidding machine of claim 1, wherein said first sealing means comprises a heat source.

12. The lidding machine of claim 1, further comprising second sealing means, wherein said second sealing means is downwardly extendable to seal the lids to the containers.

13. The lidding machine of claim 12, wherein said second sealing means comprises a heat source.

14. The lidding machine of claim 1, further comprising a vacuum source above said platens.

15. A method for filling and lidding containers, comprising the steps of:

(a) dispensing lipped containers onto a plurality of platens, each of said platens comprising means to hold at least one lipped container having a circumferential lip;

(b) dispensing a flowable material into the containers;

(c) disposing a chain of lids above the containers, wherein the lids in the chain of lids are connected by tabs extending between each lid in the chain;

(d) extending a plurality of fingers against the chain of lids to hold the chain of lids firmly against said containers;

(e) extending a straight knife to sever the lid tabs and thereby separate the chain of lids into individual lids while leaving portions of the upstream and downstream tabs attached to said severed lid extending beyond said lip;

(f) applying a first seal to secure the individual lids to the containers;

(g) extending a foot against said platens to hold the sealed lids in place;

(h) extending a curved knife to cut away said upstream and downstream portions that portion of each of the lid tabs while said foot is simultaneously holding the lids in place.

16. The lidding method of claim 15, wherein step (f) further comprises the use of heat for sealing the individual lids to the containers.

17. The lidding method of claim 15, further comprising the step of applying a second seal to secure the individual lids to the containers.

18. The lidding method of claim 17, wherein said step of applying a second seal to secure the individual lids to the containers comprises the use of heat.

19. The lidding method of claim 15, further comprising the step of vacuuming up pieces cut away from the individual lids.

* * * * *